United States Patent [19]
Camp, Jr. et al.

[11] Patent Number: 6,070,078
[45] Date of Patent: May 30, 2000

[54] REDUCED GLOBAL POSITIONING SYSTEM RECEIVER CODE SHIFT SEARCH SPACE FOR A CELLULAR TELEPHONE SYSTEM

[75] Inventors: William O. Camp, Jr., Chapel Hill; Pambiz Zangi, Raleigh; Rajaram Ramesh, Cary, all of N.C.

[73] Assignee: Ericsson Inc., Research Triangle Park, N.C.

[21] Appl. No.: 08/950,690

[22] Filed: Oct. 15, 1997

[51] Int. Cl.⁷ ........................................... H04Q 7/20
[52] U.S. Cl. ........................................ 455/456; 342/357.03
[58] Field of Search ................................. 455/456, 457, 455/561, 575; 342/357.03

[56] References Cited

U.S. PATENT DOCUMENTS

| | | |
|---|---|---|
| 4,445,118 | 4/1984 | Taylor et al. |
| 5,418,538 | 5/1995 | Lau . |
| 5,490,073 | 2/1996 | Kyrtsos ............................. 342/357.03 |
| 5,638,077 | 6/1997 | Martin ............................... 342/357.03 |
| 5,913,170 | 6/1999 | Wortham .............................. 455/457 |

FOREIGN PATENT DOCUMENTS

| | | |
|---|---|---|
| 2 264 837 | 9/1993 | United Kingdom . |
| 2 308 033 | 6/1997 | United Kingdom . |
| WO 96/07110 | 3/1996 | WIPO . |
| WO 97 33382 | 9/1997 | WIPO . |

Primary Examiner—Daniel S. Hunter
Assistant Examiner—Myron K. Wyche
Attorney, Agent, or Firm—Jenkens & Gilchrist, P.C.

[57] ABSTRACT

A Global Positioning System (GPS) receiver located at a base station of a cellular telephone network determines the location of the base station and obtains GPS ephemeris and, if available, timing information. A server uses the obtained information to calculate auxiliary information for use by a GPS receiver. The base station transmits the auxiliary information to the GPS receiver which is located within a cellular telephone operating within the service area of the base station. The cellular telephone GPS receiver uses the auxiliary information to determine the location of the cellular telephone and transmits location information to the cellular telephone network via the cellular telephone and the base station.

16 Claims, 3 Drawing Sheets

REDUCED GLOBAL POSITIONING SYSTEM RECEIVER CODE SHIFT SEARCH SPACE FOR A CELLULAR TELEPHONE SYSTEM

BACKGROUND OF THE INVENTION

1. Technical Field of the Invention

The present invention pertains in general to a method and apparatus for reducing code shift search space in a Global Positioning System receiver, and more particularly, to reducing code shift search space in a Global Positioning System receiver connected to a cellular mobile station operating within a cellular telephone system.

2. Description of Related Art

It is desirable, and likely to be mandatory in the near future, that cellular telephone systems be equipped to determine the geographical location of cellular telephones operating within the cellular telephone system. To meet this requirement it has been proposed that cellular telephones be equipped with Global Positioning System (GPS) receivers for determining the location of the cellular telephone. GPS receivers, however, are expensive, increase the cellular telephone size, and consume limited battery power available to the cellular telephone. Furthermore, GPS receivers do not function well within buildings or in other areas where GPS satellite transmissions are weakened due to an obstruction, fading, reflecting, or the like.

It is commonly known that GPS receivers can be made smaller, less expensive, and more energy efficient by eliminating certain GPS receiver functionality used to obtain auxiliary information normally obtained through the demodulation of GPS satellite signals. Instead of demodulating the GPS satellite signals, an alternative means is used to provide the GPS receiver with the needed auxiliary information. This auxiliary information includes various information such as a list of GPS satellites currently in view of the GPS receiver, Doppler shifts for the listed GPS satellites, and ephemeris data for each of the listed GPS satellites. Eliminating the need for the GPS receiver to demodulate the GPS satellite signals also allows the GPS receiver to integrate the GPS satellite signals over a longer period of time allowing for reception of weakened signals due to obstructions.

In order to calculate the auxiliary information for the GPS receiver, however, the approximate location of the GPS receiver must be known. Moreover, the closer the actual location of the GPS receiver to the location used in calculating the auxiliary information the smaller the resulting location search to be performed by the GPS receiver. For example, it is known that if the GPS receiver is given auxiliary information calculated to a location within a radius of one hundred miles of the actual location of the GPS receiver, the GPS receiver need not measure the actual range to the GPS satellites, but instead, only needs to measure a fraction of a millisecond for each of the ranges. This greatly simplifies the necessary range measurements to that of finding the relative code shift position locations to the one millisecond code cycle. In order to do this, however, the GPS receiver still must search all one thousand twenty three code shift positions for all the GPS satellites to be used in the location solution.

The code shift searches can be performed by means of a combination of a fast Fourier transform and an inverse fast Fourier transform correlator to simultaneously search all the code shift positions. This technique for finding the code shift position of a cyclic sequence is described in textbooks, such as *Digital Signal Processing* by Oppenheim & Shafer. While such an approach is more computationally efficient than a straight correlation, it is nonetheless, computationally intensive requiring additional functionality and consuming limited battery power resources. Furthermore, with the opportunity to convey information to the mobile unit to assist it in its search for the GPS satellite ranges, this method then becomes computationally inefficient as it consumes computation cycles searching for many code shift positions that are not possible.

Another solution to searching all one thousand twenty three shift code positions is to build specific hardware to search multiple code shift positions simultaneously. To date, however, hardware specific solutions have not been able to simultaneously search more than a fraction of code shift positions thus requiring multiple searches and lengthy time delays.

It would be advantageous, therefore, to devise a method and apparatus to reduce the code shift search space required to be performed by a GPS receiver and thus reduce the functionality and time required for a GPS receiver to determine its location. Furthermore, it would be advantageous to devise a method and apparatus for a GPS receiver to obtain auxiliary information for determining its location.

SUMMARY OF THE INVENTION

The present invention comprises a full functionality Global Positioning System (GPS) receiver located at either a base station or at a remote location and connected to a base station via a communication link. The full functionality GPS receiver obtains GPS ephemeris and timing information and communicates this information to a server. Alternatively, the server can obtain the ephemeris data from a data service via the cellular telephone network obviating the need for placing a GPS receiver at the base station. The server then processes the information to calculate auxiliary information for use by a reduced functionality mobile GPS receiver located inside and connected to a cellular telephone operating within the service area of the base station. The base station transmits the auxiliary information to the cellular telephone GPS receiver, either on demand by the remote unit, or periodically as a broadcast message. The GPS receiver in the cellular telephone then uses the auxiliary information to search for the code shift positions of all the appropriate codes within the signals coming from the GPS satellites. The pseudo ranges, indicative of the geographical location of the cellular telephone, are calculated from the code shift positions so measured. The cellular telephone then transmits the pseudo ranges to the cellular telephone network and the cellular telephone network calculates the geographical location of the cellular telephone. Alternatively, the cellular telephone determines its geographical location, using the GPS satellite locations derived from the ephemeris data supplied to it, and transmits the geographical location coordinates to the cellular telephone network.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF EMBODIMENTS

Figure 1:
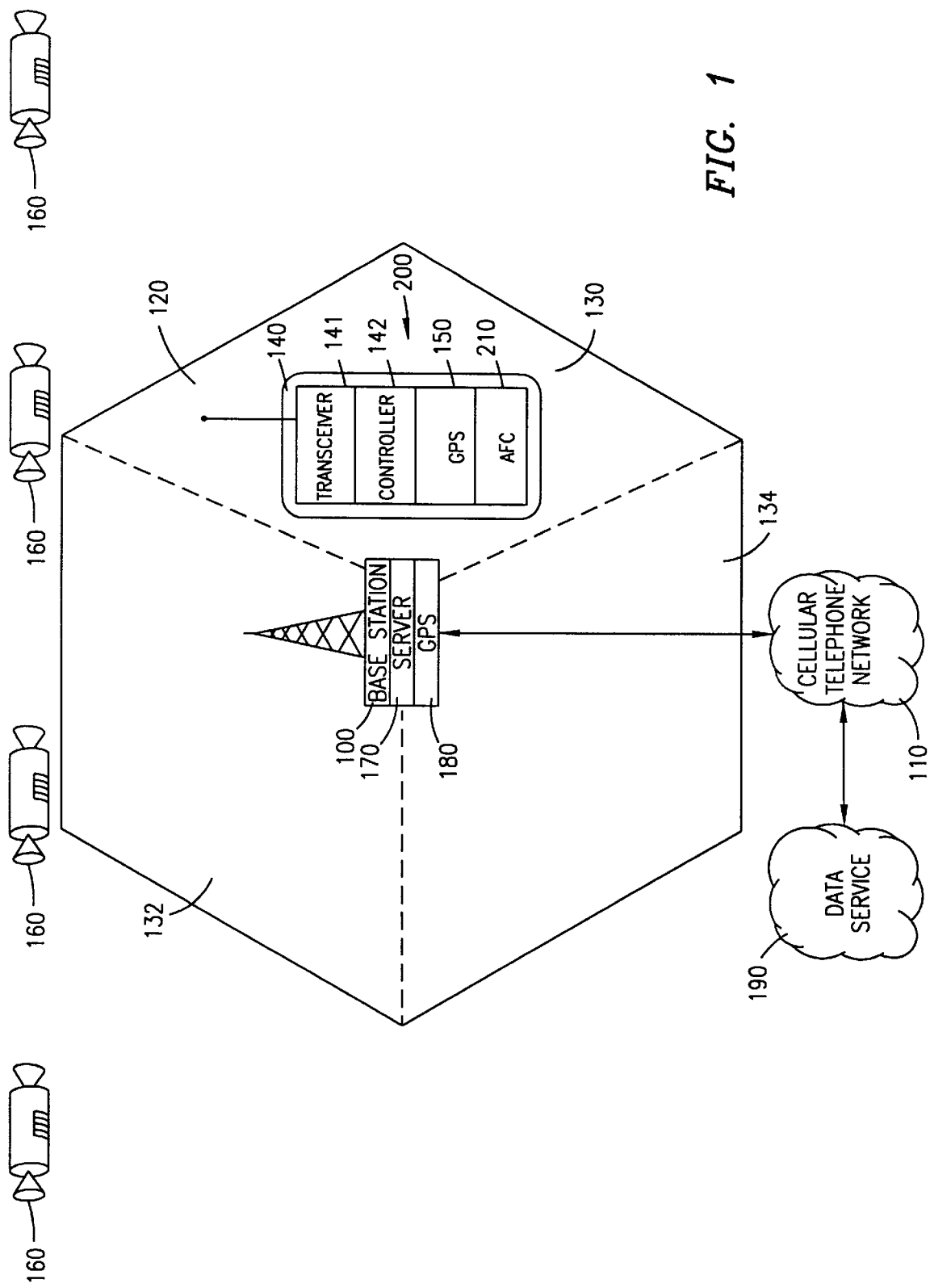
FIG. 1 is a functional block diagram of a preferred embodiment of the present invention.

Referring now to FIG. 1 there is illustrated a functional block diagram of a preferred embodiment of the present invention. A cellular telephone base station 100 located in a cell site 120 of a cellular telephone network 110 serves a cellular telephone 140. The cell site 120 is divided into a first sector 130, a second sector 132, and a third sector 134, with FIG. 1 illustrating the cellular telephone 140 as being located within the first sector 130. The cellular telephone 140 also includes a reduced functionality GPS receiver 150 which receives GPS satellite transmissions from a plurality of GPS satellites 160. The reduced functionality GPS receiver 150 does not include functionality for demodulating GPS satellite 160 signals and determining auxiliary information. Instead, the auxiliary information necessary for determining location, and which also reduces the range of Doppler frequency shifts to be searched, is provided to the reduced functionality GPS receiver 150 from an alternate source.

The present invention supplements the auxiliary information with a known location within the antenna pattern coverage area which, when combined with the GPS satellite 160 locations at the time the code shift positions are to be found, reduces the range of code shift positions to be searched from one thousand twenty three to a fraction of one thousand twenty three. The fraction is proportional to the distance between the actual location of the cellular telephone 140 and the known location. The fraction is on the order of the distance from the known location to the cellular telephone 140 in miles, divided by one hundred eighty six miles; one hundred eighty six miles being the distance corresponding to one millisecond of flight time of the GPS satellite 160 signals. The fraction is further determined by the accuracy of the time reference.

In the preferred embodiment, the known location is either the location of the base station 100 or, alternatively, the center 200 of the sector 130 in which the cellular telephone is located. If a time reference is also conveyed by the base station 100, all code shift searches are reduced to a fraction of one thousand twenty three. If, on the other hand, a time reference is not conveyed by the base station 100, then all one thousand twenty three possible code shift positions are searched for a first GPS satellite 160 and only the fraction of one thousand twenty three code shift positions are searched for the remaining GPS satellites 160.

As stated earlier, the known location within the coverage area of base station 100 is used to calculate the auxiliary information. The location can be determined by any method including the use of a GPS receiver 180 located at the base station 100 or at a server 170 which calculates the auxiliary information. The base station 100 obtains and periodically updates GPS ephemeris information pertaining to the current status of the GPS satellites 160. In a preferred embodiment, the GPS ephemeris information is obtained by the base station 100 from a data service 190 via the cellular telephone network 110. Alternatively, the information can be obtained directly from GPS satellite 160 transmissions received by GPS receiver 180 located at the base station 100 or at the server 170. In the future, when an ancillary GPS related system known as Wide Area Augmentation System (WAAS) becomes operational, the GPS receiver 180 located at the base station 100 or at the server 170 will also be capable of obtaining differential correction information. The differential correction information allows GPS receivers to calculate their location with a higher degree of accuracy.

The server 170, located either at the base station 100 or at a remote location, uses information obtained from either the GPS receiver 180 or the data service 190 to calculate auxiliary information which is subsequently communicated to the base station 100 and transmitted to the reduced functionality GPS receiver 150 located within the cellular telephone 140. The auxiliary information includes a list of GPS satellites 160 in view of the base station 100, Doppler corrections for each of the listed GPS satellites 160, and code shift positions for each of the listed GPS satellites 160 based upon a universal time coordinated time for the base station 100 location.

If the cell site 120 is divided into multiple sectors and the base station 100 can determine the sector in which the cellular telephone 140 is operating, in this example the first sector 130, the server 170 calculates the auxiliary information based on a center location 200 of the sector 130. Calculating the auxiliary information based on the center location 200 increases the accuracy of the auxiliary information since there is a greater probability that the cellular telephone 140 is located closer to the center location 200 than the base station 100. The geographical coordinates for the center location 200 need not be at the actual center of the sector 130, but instead, can be at a location where cellular telephones are most likely to be located, for example at a shopping mall, office complex, airport, or sporting facility located with the sector. If, however, the cell site 120 is not divided into multiple sectors or if the base station 100 cannot determine the sector in which the cellular telephone 140 is operating, the auxiliary information is calculated based on the geographical location of the base station 100.

In an alternative embodiment, the geographical center location of a Business Transaction Area or Metropolitan Service Area is used instead of the geographical location of the base station 100. Every cellular telephone service area is identified in a System ID (SID) which is read by the cellular telephone 140. The cellular telephone 140 can either store auxiliary information pertaining to these locations and reference the information associated with the current SID or the auxiliary information is stored in the server and 170 and the cellular telephone provides the SID to the server 170 which provides the auxiliary information.

After the server 170 calculates the auxiliary information, the base station 100 transmits the auxiliary information to the reduced functionality GPS receiver 150 in the cellular telephone 140. The auxiliary information can be transmitted to the reduced functionality GPS receiver 150 in a variety of ways. For example, in a cellular telephone network using the Global System for Mobile communications protocol (GSM), information can be sent via a short messaging service message, packet data message sent over a traffic channel, or a broadcast message over a control channel. The auxiliary information is sent in a manner consistent with methods commonly known in the industry for the transmission of information between the cellular telephone network 110 and the cellular telephone 140. A transceiver 141 located within the cellular telephone 140 receives the transmissions from the base station 100 and a controller 142, also located within the cellular telephone 140, identifies the information as auxiliary information and provides the reduced functionality GPS receiver 150 with the auxiliary information. Furthermore, the auxiliary information can be transmitted either on demand to a specific cellular telephone or to a plurality of cellular telephones via a broadcast channel.

To obtain a significant reduction in the code shift search space it is desirable that the timing coordination signal be accurate to within fifty microseconds or less of the universal time coordinated time used by the GPS system. Therefore, timing information is transmitted to the reduced functionality GPS receiver 150 via the cellular telephone 140 in a variety of ways depending on the protocol of the cellular telephone network 110. For example, in a digital protocol system such as GSM or IS-136 (Digital AMPS), the timing information is communicated via a message which states that a particular frame synchronization number will occur, or has occurred, at a certain time. In an analog Advanced Mobile Phone System (AMPS) system, a time tick consisting of a sharp pulse can be used to denote the reference time for determining the code shift positions for each GPS satellite 160.

The reduced functionality GPS receiver 150 located within the cellular telephone 140 makes use of the auxiliary information to measure code shift positions for each GPS satellite 160. For long integration times, for example 1 second, the actual code shift positions change up to 3 chips per second during the period. This change is compensated for by slipping the timing of the correlation code to stop the change prior to using the code shift position value in the location solution. The code shift positions are translated into delta ranges, measured for example in meters, to each GPS satellite 160. The delta ranges are calculated by subtracting the code shift positions measured from the code shift positions calculated for each GPS satellite 160 location obtained from the ephemeris data at the known location. A vector of these delta ranges, multiplied by the inverse of the matrix of unit vector cosines from the known location to each GPS satellite 160, yields the delta x, delta y, and delta z, from the known location.

Figure 2:
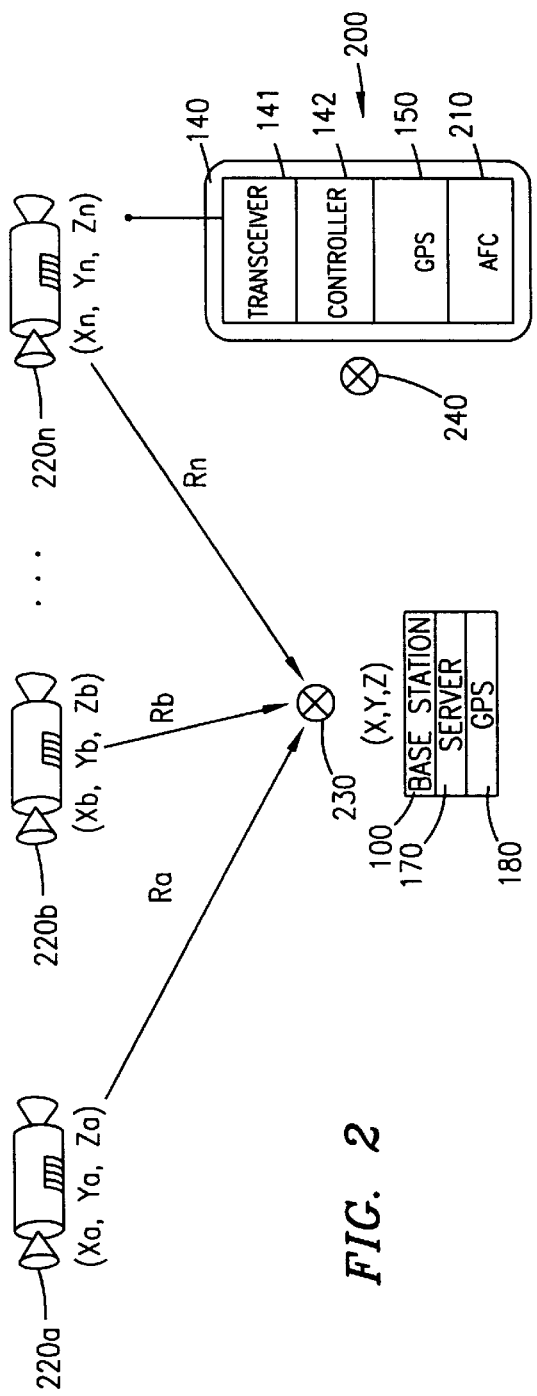
FIG. 2 depicts a plurality of GPS satellites and a known and unknown location illustrating an example for predicting code shift positions.

Referring additionally now to FIG. 2, there is illustrated a plurality of GPS satellites $220_{a-n}$, a known location 230 and an unknown location 240 illustrating an example for predicting code shift positions. The calculations described below, are preformed by the server 170 and the predicted code shift positions are transmitted to the reduced functionality GPS receiver 150 as part of the auxiliary information. Alternatively, the calculation can be preformed by the reduced functionality GPS receiver 150. Each of the GPS satellites $220_{a-n}$ listed in the auxiliary information has a set of three dimensional coordinates ($X_{a-n}$, $Y_{a-n}$, $Z_{a-n}$). The known location 230 also has a set of three dimensional coordinates (X,Y,Z). A range $R_{a-n}$ to each GPS satellite $220_{a-n}$ from the known location 230 is represented by the expression:

$$R_{a-n}=\sqrt{((X_{a-n}-X)^2+(Y_{a-n}-Y)^2+(Z_{a-n}-Z)^2)}$$

The signal propagation time $T_{a-n}$ from each of the GPS satellites $220_{a-n}$ is represented by the expression:

$$T_{a-n}=R_{a-n}/(\text{speed of light})$$

The predicted code shift position $C_{a-n}$ for each of the satellites $220_{a-n}$ is represented by the expression:

$$C_{a-n}=\text{fractional component of } [(T_{a-n}/1000)]* 1023;$$

wherein $T_{a-n}$ is divided by one thousand in order to express the signal propagation time in milliseconds and the fractional component of ($T_{a-n}/1000$) is used in order that the predicted code shift positions fall within zero to one thousand twenty three, the possible range of code shift positions.

Due to both uncertainties in the time reference and the fact that the unknown location 240, corresponding to the location of the cellular telephone 140, is located some distance from the known location 230, the search space around the predicted code shift positions are expanded to $C_{a-n}$ plus and minus some offset number to create a code shift search space. The offset is based on the size of the service area and the uncertainty in the time reference wherein, larger service areas and increased uncertainty result in larger offsets with the uncertainty in the time reference being the predominant factor.

The reduced functionality GPS receiver 150 searches the code shift search space for the first satellite $220_a$ to determine an actual code shift position $C'_a$ for the first satellite $220_a$. Since the error is attributed predominantly to the accuracy of the time reference and not the distance between the unknown location 240 and the known location 230, the difference between the predicted code shift position $C_a$ and the measured code shift position $C'_a$ is added to the remaining predicted code shift positions $C_{b-n}$. This results in a more accurate prediction and thus, a smaller code shift search space. If the resulting predicted code shift positions $C_{b-n}$ remaining after the offset has been added is greater than one thousand twenty three, one thousand twenty three is subtracted from the resulting predicted code shift positions $C_{b-n}$ in order that the predicted code shift positions fall within zero to one thousand twenty three, the possible range of code shift positions.

If the time reference is unavailable, the initial code shift search for the first GPS satellite $220_a$ requires a search encompassing all one thousand twenty three possible code shift positions. After the initial search, however, the code shift search process for the remaining GPS satellites $220_{b-n}$ is identical to the process used when the time reference is available. Thus, the difference between the predicted code shift position $C_a$ and the measured code shift position $C'_a$ is added to the remaining predicted code shift positions $C_{b-n}$ resulting in a more accurate prediction and thus, a smaller code shift search space. If the resulting predicted code shift positions $C_{b-n}$ remaining after the offset has been added is greater than one thousand twenty three, one thousand twenty three is subtracted from the resulting predicted code shift positions $C_{b-n}$ in order that the predicted code shift positions fall within zero to one thousand twenty three, the possible range of code shift positions.

A vector CD is created from the differences between the measured code shift positions $C'_{a-n}$ and the predicted code shift positions $C_{a-n}$. These values are often expressed in meters by multiplying by the speed of light in meters per second. Multiplying the vector CD by an inverse of the matrix of cosines of unit vectors from the known location 230 to each of the GPS satellite locations at the measurement time yields a correction vector corrections for X, Y and Z which are added to the known location 230 to determine the unknown location 240.

Alternatively, instead of calculating the predicted code shift positions $C_{a-n}$ as described above, the GPS receiver 180 located at the known position 230 can be used to measure the values directly. Using the GPS receivers, however, requires GPS receivers to be located at each base station.

Figure 3:
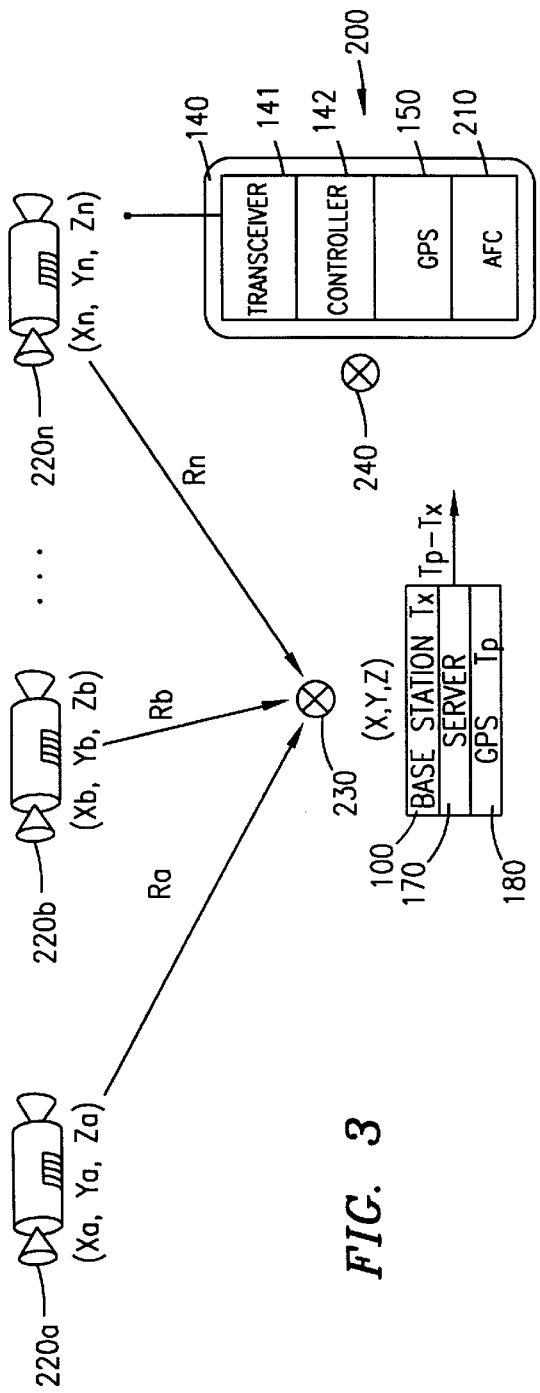
FIG. 3 illustrates conveyance of a time reference to a reduced functionality GPS receiver located within a cellular telephone.

Referring additionally now to FIG. 3, there is illustrated conveyance of a time reference to a reduced functionality GPS receiver 150 located within a cellular telephone 140. The distance $R_a$ from the first GPS satellite 220a to the known location 230 at the time of measurement is calculated in the manner described in FIG. 2, and the predicted code shift position $C_a$ is calculated also in a manner described in FIG. 2. The same code shift position $C_a$ is obtained in a correlator only if the base timing of the correlator code generator is properly synchronized with the GPS system. To obtain synchronization, the base timing of the GPS receiver 180 located at the base station 100 is set to yield the $C_a$ code shift position as predicted. A reference point $T_p$ on the base timing generator is selected and compared to the time of a base station 100 frame synchronization event $T_x$. The time difference between $T_p$ and $T_x$ is communicated to the base station 100 which communicates the difference to the reduced functionality GPS receiver 150 via the cellular telephone 140. The reduced functionality GPS receiver 150 uses the difference to set its internal timing base generator offset by an equal amount from its reception of the frame synchronization event.

Using any of a number of commonly known methods, correlation is effectuated using either hardware or software. Since the cellular telephone 140 is typically located within ten miles or less of the serving base station 100 and still closer to a central location 200, the code shift position transmitted to the reduced functionality GPS receiver 150 in the auxiliary information is very close to the actual code shift position for the location of the cellular telephone 140. Therefore, the code shift search space which the reduced functionality GPS receiver 150 must search is greatly reduced.

Using standard GPS hardware with simultaneous search engines (correlators), the reduced functionality GPS receiver 150 searches for the code shift position of a first GPS satellite 160 listed in the auxiliary information. Since it is possible that the signal strength of the first GPS satellite 160 to be searched maybe very weak, a long correlation time is used to achieve a processing gain. As an example, a one second correlation achieves a twenty decibel processing gain. Even at a very weak signal strength level, use of a hardware correlator simultaneously searching two hundred half code shift positions with a time reference accurate to within fifty microseconds yields a one second long parallel correlation of one hundred half code shift positions on either side of the predicted code shift position which is sufficient to find the exact code shift position for the GPS satellite 160.

Alternatively, if the time reference is not provided to the reduced functionality GPS receiver 150, a search of all one thousand twenty three possible code shift positions for the first GPS satellite $220_a$ is preformed and once the actual code shift position is determined, an internal time reference based on the predicted code shift position for the first GPS satellite $220_a$ is calculated. Subsequent searches for the remaining GPS satellites $220_{b-n}$ code shift positions are thus reduced accordingly.

When all code shift positions have been identified, the reduced functionality GPS receiver 150 transmits the resulting pseudo ranges to the cellular telephone network 110 via the cellular telephone 140 and the base station 100, whereupon, the server 170 determines the geographical location of the cellular telephone 140. Alternatively, the reduced functionality GPS receiver 150 can calculate the geographical location using the pseudo ranges and transmit geographical coordinates back to the cellular telephone system 110 via the cellular telephone 140 and the base station 100.

The pseudo ranges or geographical coordinates can be transmitted to the cellular telephone network 110 in a variety of ways. For example, in a cellular telephone network using the Global System for Mobile communications protocol, information can be sent via a Short Messaging Service. The information is sent in a manner consistent with methods commonly known in the industry for the transmission of information between the cellular telephone 140 and the cellular telephone network 110. The controller 142 identifies the information as pseudo ranges or geographical coordinates and provides the information to the transceiver 141 for transmission to the base station 100.

In a second embodiment, the cellular telephone 140 is further equipped with an automatic frequency control feedback 210 to lock the clock frequency of the cellular telephone 140 to the carrier frequency of the base station 100. This allows Doppler corrections to be made with sufficient accuracy such that only a few attempts at Doppler correction are required to correlate the GPS satellite 160 signals.

Figure 4:
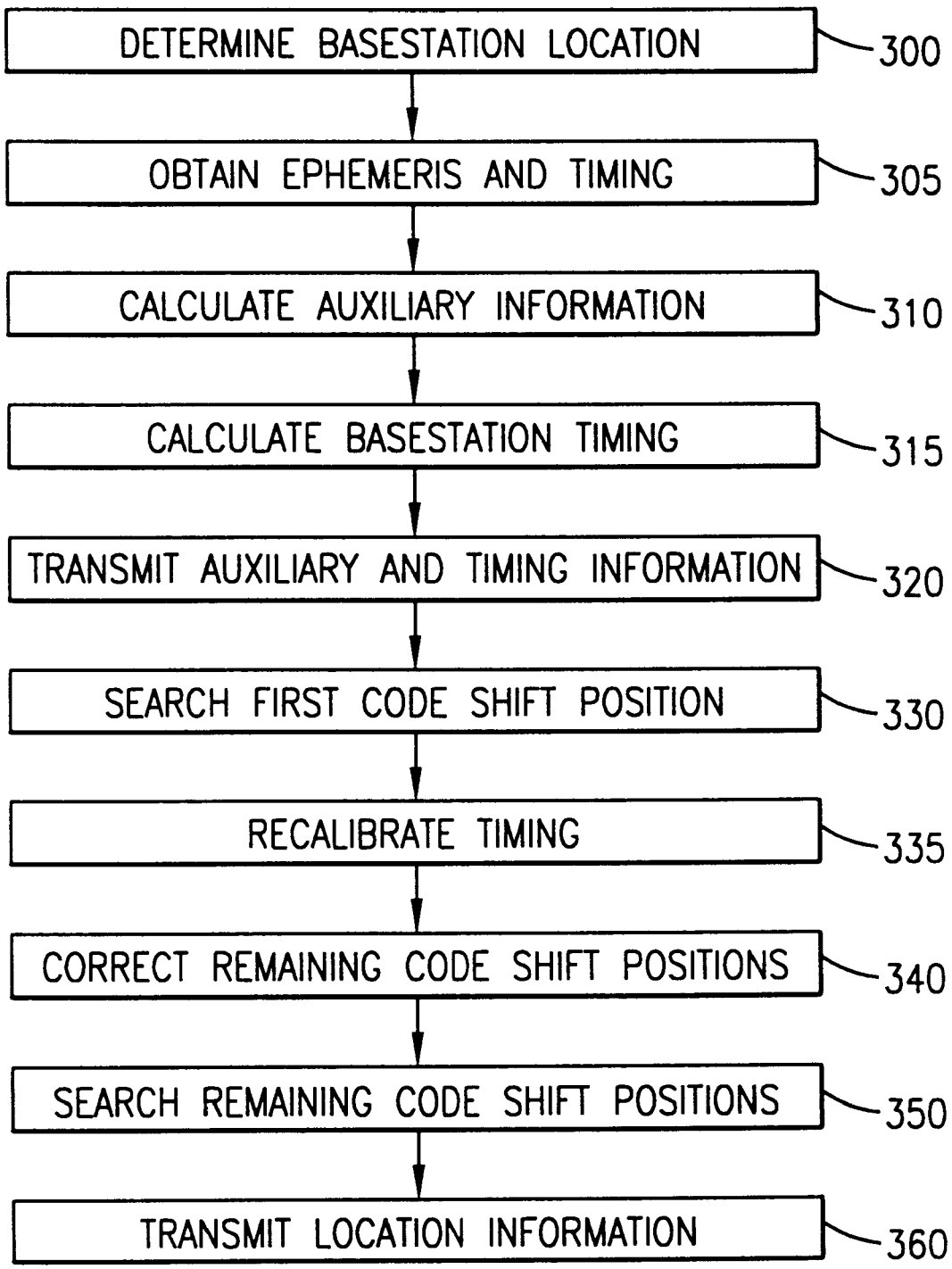
FIG. 4 is a flow diagram of the preferred method for implementing the present invention.

Referring additionally now to FIG. 4, there is illustrated a flow diagram of a preferred method for implementing the present invention. The location of a base station of a cellular telephone network is determined (step 300). A server located at the base station obtains GPS ephemeris and, if available, timing information (step 305). The server obtains the GPS ephemeris information either from a data service, or alternatively, from a GPS receiver located at the base station.

The server calculates auxiliary information (step 310) and calibrates base station timing (step 315). The server transmits the auxiliary and timing information (step 320) to either an individual cellular telephone or broadcasts the information to all cellular telephones via a broadcast channel. The cellular telephone then communicates the information to reduced functionality GPS receiver located within the cellular telephone.

Using the transmitted data, the GPS receiver located within the cellular telephone searches a code shift search space of a first GPS satellite (step 330) to determine the actual code shift position. Once the first code shift position is located, the GPS receiver recalibrates its timing (step 335) and corrects errors in the predicted code shift positions for the remaining GPS satellites (step 340). The GPS receiver then searches the remaining code shift positions (step 350) and transmits location information (step 360) to the cellular telephone network via the cellular telephone and the base station.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system for reducing code shift searches at a cellular telephone at an unknown location within a cellular telephone network comprising:

a receiver obtaining global positioning system ephemeris information;

a server for calculating a plurality of predicted code shift positions based on a known location and the ephemeris information;

a transmitter for communicating the plurality of predicted code shift positions to the cellular telephone; and a transceiver located within the cellular telephone at the unknown location for receiving the plurality of predicted code shift positions; and a reduced functionality global positioning receiver located within the cellular telephone functioning for searching a limited number of code shift positions for each GPS satellites associated with the cellular telephone, the limited number of code shift positions based upon the plurality of predicted code shift positions, and calculating location indicating information.

2. The system recited in claim 1, wherein the known location is a geographical center of a metropolitan service area.

3. The system recited in claim 1 wherein the known location is a location of the base station.

4. The system recited in claim 3, wherein the receiver for obtaining global positioning system ephemeris information is a full functionality global positioning receiver located at the base station.

5. The apparatus recited in claim 3, wherein the receiver for obtaining global positioning system ephemeris information obtains the global positioning system ephemeris information from a data service.

6. The system recited in claim 3, wherein the transmitter for communicating the plurality of predicted code shift positions is a cellular telephone.

7. The system recited in claim 6, wherein the plurality of predicted code shift positions is communicated via a control channel of the cellular telephone.

8. The system recited in claim 6, wherein the plurality of predicted code shift positions is communicated via a traffic channel of the cellular telephone.

9. The system recited in claim 6, wherein the plurality of predicted code shift positions is communicated via a short messaging service message of the cellular telephone.

10. The system recited in claim 3, wherein the server calculates the plurality of predicted code shift positions based on a center location of a sector of the cell site within which the global positioning receiver is located.

11. An apparatus for determining the geographical location of a cellular telephone comprising:

a transceiver located within the cellular telephone at an unknown location for receiving a plurality of predicted code shift positions from a cellular telephone network; and a reduced functionality global positioning receiver located within the cellular telephone for searching a limited number of code shift positions for each GPS satellite, the limited number of code shift positions based upon the received plurality of predicted code shift positions, and calculating location indicating information.

12. The apparatus recited in claim 11, wherein the reduced functionality global positioning receiver calculates pseudo ranges and transmits the pseudo ranges to the cellular telephone network.

13. The apparatus recited in claim 11, wherein the reduced functionality global positioning receiver calculates geographical coordinates and transmits the coordinates to the cellular telephone network.

14. A method for reducing code shift search space in a reduced functionality global positioning system receiver operating within a cellular telephone network comprising the steps of:

determining a location of a base station serving a cell site of the cellular telephone network within which the global positioning system receiver is located;

obtaining global positioning system ephemeris information;

calculating a plurality of predicted code shift positions from the ephemeris information;

communicating the plurality of predicted code shift positions to the global positioning system receiver;

determining a code shift search space for satellites associated with the global positioning system receiver, the code shift search space comprising a limited number of the code shift positions;

searching the code shift search space for each satellite to determine the code shift positions of the associated satellites; and determining a position of the global positioning system receiver from the determined code shift positions.

15. The method recited in claim 14, wherein the step of obtaining ephemeris information further includes the step of obtaining timing information.

16. The method recited in claim 14, further including the step of determining a sector of the cell site within which the global positioning system receiver is operating, and wherein the step of calculating the a plurality of predicted code shift positions by the cellular telephone network is based on the center location of the sector.

* * * * *